United States Patent [19]

Pensa

[11] Patent Number: 4,783,193

[45] Date of Patent: Nov. 8, 1988

[54] COMPOSITION AND PROCESS FOR STRIPPING COLOR FROM SYNTHETIC POLYMER PRODUCTS

[76] Inventor: Laury Pensa, 1585 B Bergen Bldg., Leonia, N.J. 07605

[21] Appl. No.: 925,987

[22] Filed: Nov. 3, 1986

Related U.S. Application Data

[63] Continuation of Ser. No. 743,013, Jun. 10, 1988, abandoned.

[51] Int. Cl.$^4$ ................................................. D06L 3/00
[52] U.S. Cl. ........................................... 8/102; 8/108.1
[58] Field of Search ........................ 8/102, 108 A; 252/187.25, 187.26, 187.28, 100; 134/26

[56] References Cited

U.S. PATENT DOCUMENTS

| | | | |
|---|---|---|---|
| 1,547,187 | 7/1925 | Weis | 8/111 |
| 3,908,680 | 9/1975 | Krezanoski | 134/36 |
| 4,013,575 | 3/1977 | Castrantas | 8/111 |
| 4,116,851 | 9/1978 | Rupe et al. | 252/103 |

Primary Examiner—Paul Lieberman
Assistant Examiner—John F. McNally
Attorney, Agent, or Firm—C. Robert Rhodes; Judith E. Garmon

[57] ABSTRACT

The present invention provides a process that utilizes synergistic chemical systems for decolorizing synthetic polymer materials, such as polyester, in a variety of shapes including fibers, yarns, fabrics, sheets and films. These chemical systems are unstable dispersions of alkyl halides and aqueous solutions of bleaching/oxidizing agents, such as the alkali metal salts of hypohalites, to which specified quantities of organic or inorganic acids and of surfactant/wetting agents are added. The polymeric materials are exposed to the activated chemical systems in appropriate reaction vessels. The stripping process is rapid and the resulting products are completely color-free. Further, the alkyl halide and bleaching/oxidizing components of the chemical systems can be reclaimed after the decolorizing process for recycling.

32 Claims, No Drawings

COMPOSITION AND PROCESS FOR STRIPPING COLOR FROM SYNTHETIC POLYMER PRODUCTS

This is a continuation of application Ser. No. 743,013 filed June 10, 1988 now abandoned.

FIELD OF THE INVENTION

The present invention relates to the decolorization of synthetic polymer materials and, specifically, to a composition and process for stripping coloring matter such as dyestuffs from polyester and other polymeric materials. Decolorization processes for polymeric materials differ significantly from normal bleaching processes.

Bleaching processes are generally performed to remove naturally occurring colors, tints, or other foreign materials such as oil or stains from natural fibers such as cotton, wool, flax, and the like. Also, bleaching is used on man-made polymeric fibers to remove coloring matter which is inherent in the chemicals or which occurs as colored impurities produced during the chemical synthesis and manufacture of such fibers. However, these bleaching processes are not intended for the removal of dyestuffs from polymeric materials. Within the scope of this invention, decolorization is generally defined as the process of removing humanly introduced dyestuffs from polymeric materials, and requires an awareness of the effects of the decolorizing chemical systems on the chemical composition of the dyestuffs and the polymeric fibers. The problems inherent in previously known processes for decolorizing polymers are detailed below.

BACKGROUND AND SUMMARY OF THE PRESENT INVENTION

Procedures and chemical compositions for the removal of color from synthetic polymer shapes such as fibers, yarns, fabrics or sheets are known in the prior art and are quite well documented. The most commonly used method for stripping dye from polymeric materials, such as polyester, is by treating such materials, near the boil, with an aqueous bath containing a bleaching agent, such as sodium chlorite, an acid and a dye carrier. The polyester materials are then thoroughly rinsed and given an antichlor treatment followed by a final aqueous rinse. Other methods use 1% to 2% aqueous emulsions of chlorinated or other organic solvents. However, with these procedures extreme difficulty is encountered in completely decolorizing the polymeric materials. Furthermore, processing time runs into several hours due to the requirement of a multiplicity of steps before and after the actual lengthy stripping stage. Invariably the final decolorized product is never totally white.

In another domain, polyester photographic or x-ray film bases are tinted or dyed in order to obtain various effects and in the particular case of x-ray films, to enhance the sharpness of the image. The exposed films are desilvered and the tinted film is then scrapped or disposed in land fills. It is therefore most desirable to reclaim the scrap by removing totally the residual tint and reusing it as film or other plastic products. However, present processes are based on solvent extractions, with the film remaining in contact with the solvent and under agitation for very lengthy periods of time without achieving total color removal. The use of organic solvents, processing time and special equipment make such stripping methods very expensive and not very successful.

Due to this lack of suitable processes for effectively and economically decolorizing synthetic polymeric materials to a totally white and color free product, textile items have to be reworked by cumbersome methods and x-ray film scrap never reaches a color free state suitable for effective reclamation. According to the process of this invention, polymeric materials that are colored with one or more dyestuffs can be rapidly and effectively decolorized by removing the coloring chemicals and producing a white, color-free product. Thus this invention overcomes many of the problems that are inherent in previously known decolorizing processes and in addition provides several advantages. The chemical systems of the present invention use relatively inexpensive and readily available chemicals which, when combined as taught below, generate synergistic chemical stripping compositions that rapidly and effectively remove all coloration from polymeric materials such as polyester in various shapes sch as film, yarn, fabrics or sheets. Further, the present invention does not require utilizing the extreme conditions necessary in some of the prior art methods that cause significant swelling, softening, or physical damage to the polymeric materials. Excellent stripping is achieved without the undesirable effects of possible polymer degradation and negative changes in physical performance properties.

SUMMARY OF THE PRESENT INVENTION

The present invention provides a process for removing color from synthetic polymer materials broadly comprising the steps of: (1) preparing a chemical system where the stripping activity has been significantly increased by the synergism of the chemical composition; (2) contacting the polymeric materials with the chemical system where the temperature, pressure and contact time of the process are interrelated and prescribed to effectuate the total removal of dye coloration; (3) removing the chemical system for recovery and re-use; (4) rinsing to remove residual chemicals; and (5) drying the decolorized product.

The dye stripping composition utilizes an organic chemical that will not degrade the polymeric material and is not completely miscible with the aqueous medium of the bleaching component. In the preferred embodiment, the organic chemical is an alkyl halide and the preferred bleaching agent is an alkali metal or alkaline earth metal salt of a hypohalite. The preferred alkali metals are lithium, sodium or potassium; the preferred alkaline earth metals are magnesium or calcium, and the hypohalite is selected from the group including hypocholite, hypobromite or mixtures thereof. Further, in the preferred embodiment, the chemical system is maintained in a coarse dispersion by the use of an appropriate surfactant, and in an acidified condition by the addition of acid selected from both mineral and organic acids which are soluble in the aqueous phase of the chemical system.

The process of this invention obviates the poor performance of the existing procedures for removing color from polymeric materials by utilizing the high decolorizing activity generated synergistically by the components of the chemical system and the operating conditions of the process.

The present invention is predicated on the discovery that a rapid and total removal of color from synthetic polymers is achieved by exposing such materials to a selected group of highly active systems containing two primary components; which components, when utilized singly, even at very high concentrations or as pure components, do not perform effectively. The unexpected high activities described herein led to the discovery of the process and of this selected group of chemical systems that can be broadly characterized as coarse dispersions of an organic agent from a specified grouping of chemicals in an aqueous solution of a bleaching-/oxidizing agent also from a specified category of agents, with the acid level of the total chemical system adjusted by the addition of an aqueous solution of a mineral or organic acid. The unique performance of this process can be construed as resulting from the high activity developed within the synergized chemical systems. Thus, synthetic polymer materials exposed to such systems are rapidly decolorized without significantly effecting the mechanical and physical properties of the polymers.

It is hypothesized that the organic component of the synergized chemical system rapidly interacts on the surface of the synthetic polymer to bring the bleaching-/oxidizing agent in contact with the dyestuffs or the coloring agents which are decolorized and stripped through the vehicle of the organic component. Further, the flexibility of the chemical systems is apparent by the range of ratios in which the two primary components can be combined for the process. This leads to the further hypothesis that a unique synergism is developed that allows each component to perform at high activity levels even if present in relatively small concentrations.

Additionally, the process that utilizes such decolorizing chemical systems is preferably carried out below the glass transition temperature (Tg) of the synthetic polymer. The glass transition temperature depends on both the chemical composition and/or type and on the physical state of the synthetic polymer. For example, polyester, such as polyethylene terephthalate, has a Tg of 67° C. for the amorphous and Tg of 81° C. for the crystalline regions, and rises to Tg of 125° C. for the oriented condition. Nylon has similar glass transition temperatures. This contributes to minimizing any degradation of the mechanical and physical properties of the synthetic polymer materials which are being stripped.

In the preferred embodiment, the operating temperature is held below the boiling point of the organic chemical and/or the aqueous medium, when the process is carried out at atmospheric pressure. In a closed vessel and under pressure, the temperature may be raised to 125° C.

The contact time required to achieve total color removal varies with the operating temperature and pressure conditions that are utilized. At the upper end of the range total decolorization is extremely rapid. For certain colors and shapes of the polymeric material, complete decolorization can be achieved in one minute or less.

The process further allows the decolorizing process to be carried out in various types of vessels and equipment with the flexibility of using both atmospheric and higher pressures with static or dynamic contact of the dyed polymeric material and the chemical system. Since the equipment can be easily engineered to meet the requirements of the operating conditions, the chemical system can be easily reclaimed by appropriated distillation and condensation of the organic chemical while the generated bleaching agent components, such as chlorine, can be scrubbed through an alkali hydroxide such as sodium hydroxide, to regenerate the bleaching agent, such as a sodium hypochlorite.

It is therefore an objective of the present invention to provide a decolorizing process that is effective in achieving a rapid removal of the coloring matter while minimizing the degradation in physical and performance properties of the polymeric material that is being decolorized.

It is a further objective to provide chemical stripping systems that can be used to remove color from synthetic polymer materials in all shapes such as chips, films, sheets, fibers, ribbons, fabrics, rods, tubes, containers or bottles.

It is also an objective to provide a rapid, effective and economically viable process for stripping color from polymeric materials such as polyester and nylon and achieve a white, color-free product.

To accomplish these and other objectives the present invention provides versatile and composition-flexible chemical systems based primarily on an organic chemical agent and an aqueous solution of a bleaching agent which act synergistically to totally remove coloring matter from a variety of synthetic polymer products.

Another objective is the provision of color stripping chemicals systems and process that utilize machinery and operational procedures of minimal complexity and provide the capability of recovering the main active chemical components of the stripping system, thus contributing further to the favorable economics of the decolorizing process.

Environmental and economic benefits result because the main components of the stripping composition are not discharged into the environment, but are collected and recycled in subsequent processes.

A group of special chemicals also has been identified that is within the overall scope of the present invention in as much as an organic chemical agent is mixed with a bleaching/oxidizing agent to generate a synergestic system for decolorizing polymeric materials. However, this special group does not totally meet all the physical characteristics of the preferred chemical systems. In this group the chemicals show some degree of interaction with the synthetic polymer, are in some cases soluble in the aqueous medium of the dye stripping composition, and some are solids. Examples of such special organic chemicals are: dimethyl formamide, hexane, salicylic acid, monochlorobenzene and dimethyl sulfoxide.

Additional features and advantages of the present invention will become more apparent by a study of the following detailed description of the preferred embodiment.

DETAILED DESCRIPTION OF THE PREFERRED EMBODIMENT

Many multiple stage, single component, organic solvent or bleaching agent systems exist, but none gives a satisfactory result. Most of them are lengthy and cumbersome procedures that can also detrimentally effect the bulk and surface characteristics of the polymeric materials.

The preferred embodiment of the present invention generally comprises a chemical composition for dye stripping, which composition comprises (a) an organic chemical agent (b) an aqueous solution of a bleaching-/oxidizing agent (c) an acid to appropriately adjust the acidity to the specified level and (d) a chemical compound with surface active and/or dispersing characteristics added in an amount to produce a coarse and relatively unstable dispersion of the organic chemical and the aqueous solution of the bleaching agent and the acid compound.

The organic chemical agent of the above composition is selected from the groups consisting of:

1. Alkyl halides represented by R-X, where R is an alkyl radical with 1 to 8 carbon atoms and X is a mono- or polyhalide such as chloride, bromide and fluoride. Examples of such alkyl halides are mono-, di-, tri- and tetrahalomethanes, ethanes, propanes, butanes, pentanes, hexanes, heptanes and octanes. Within the more preferred embodiment, examples of the alkyl halides are: methylene chloride (B.pt.40.8° C.), methylene bromide (B.pt.98.2° C.), ethylene chloride (B.pt.83.8° C.), 1,2 and 1,3dichloropropane (B.pt.96° and 124° C.) and 1,2 and 1,3dibromopropane (B.pt.142° and 167° C.).

2. Mixed alkyl halides represented by R-X, where R is an alkyl radical with 1 to 8 carbon atoms and X is a mixed polyhalide such as chloride and bromide. Examples of such mixed alkyl halides are di-, tri- and tetrahalo-methanes and ethanes. Within the more preferred embodiment, examples of the mixed alkyl halides are bromochloromethane (B.pt.68° C.) and bromochloroethane (B.pt.103.7° C.).

The preferred aqueous bleaching/oxidizing solution is one chosen from a group consisting of:

1. Alkali metal and alkaline earth metal salts of hypohalites where the alkali metal can be lithium, sodium or potassium and the alkaline earth metals are represented by calcium or magnesium. The hypohalite is hypochlorite, hypobromite or mixtures thereof.

2. Hydrogen peroxide.

3. Alkali metal halites, such as sodium chlorite.

4. Bromine and chlorine.

5. Perborates

6. Peracetic acid.

The acid is selected from the group consisting of:

1. Mineral acids such as hydrochloric or phosphoric acids.

2. Mono-, di- or tricarboxylic acids, such as formic, acetic and oxalic acids.

3. Acid anhydrides, such as acetic anhydride.

4. Hydroxy carboxylic acids, such as glycolic and citric acids.

The surface active and/or dispersing agent is selected from the whole field of such agents whether nonionic or anionic. Typically, the preferred surface active or dispersing agent is one that is stable to the conditions developed in the stripping system, and with sufficient dispersing properties to maintain a coarse dispersion of the organic chemical and the aqueous bleaching/oxidizing solution without, however, imparting significant stability. The purpose being to expose the surface of the polymeric material during the decolorizing process to the simultaneous synergistic action of the organic and the aqueous bleaching/oxidizing agents. It is important that the stability of the dispersion be such that at the end of the process the organic chemical agent is easily separated from the dye stripping system by distillation and condensation; or by the latter if the processing pressures and temperatures are high enough to cause autoevaporation without frothing and carryover.

The chemicals in the dye stripping systems are selected from the aforesaid groups and are combined in a range of prescribed quantities detailed hereinafter to achieve the highly active compositions utilized in the process of this invention. The organic chemical agent is mixed with the aqueous solution of the bleaching/oxidizing agent to which a specific amount of acid is added, in a relative volume ratio of organic agent to aqueous solution ranging from approximately 5:95 to 90:10. The preferred specification is a range from approximately 10:90 relative volume ratio to about 60:40. The concentration of the bleaching/oxidizing agent in the aqueous solution may range from 0.05% to 40% by weight of the total aqueous bleaching/oxidizing solution but a preferred weight concentration range is 0.01% to 10%. The acid addition to the system can vary from 0.01% to 10% by weight of the total aqueous solution. The wetting or dispersing agent is added in sufficient concentration to achieve the desired unstable, coarse dispersion. Typically, the concentration of the surfactant, such as dioctyl sodium sulfosuccinate, will range from 0.01% to 1% of the total weight of the dye stripping composition.

The decolorizing process of the present invention can be carried out in an unsealed vessel when the temperature ranges from ambient to less than the atmospheric pressure boiling point of the organic chemical component and/or the aqueous medium. Since such organic agents tend to vaporize below their boiling point, provisions should be made to prevent escape of the vapors. This is desirable both to prevent environmental contamination and reduce costs due to chemical loss. Commercially available equipment for treating textiles, for stock or package dyeing and the like could be suitably modified to carry out the process at atmospheric pressure. Enclosed pressure vessels are used when the processing temperature is specified above the boiling point of the organic chemicals and/or the aqueous medium. Equipment is also commercially available for carrying out the decolorizing process at elevated temperature conditions of up to approximately 125° C. Such enclosed vessels are pressure rated to withstand the autogeneous pressure of the chemical system when the process is carried out at relatively elevated temperatures. The aforesaid types of equipment could be also appropriately modified to handle most shapes of the polymeric material, such as fibers, yarns, fabrics, chips, sheets or films.

Reference is now made in detail to the preferred embodiment of the present invention. Accordingly, a process is provided that utilizes the developed synergistic activity of a chemical system to rapidly strip and decolorize synthetic polymer materials, such as polyester or nylon, to white and color-free products. The colored polymeric material, in any of a variety of shapes, is brought into contact with the chemical system that comprises: the alkyl halide, generally immiscible with water, such as methylene chloride or bromochloromethane; the aqueous solution of the bleach/oxidizing agent, such as sodium hypochlorite; and the acid, such as a acetic or hydrochloric acid. A surfactant, such as dioctyl sodium sulfosuccinate, is used to maintain the coarse dispersion. The chemical system in its active state is either circulated through the colored synthetic polymer material, stirred together or contacted in any of a variety of methods that are appropriate to the particular operation. Generally, it is desirable to maintain agitation of the chemical system in order to avoid separation of the alkyl halide and the bleaching agent. Decolorization of the synthetic polymer is achieved within minutes by using systems specifically formulated to synergistically produce high activity levels. The formulation of the system can be adjusted to vary, over a fairly wide range, the exposure time for complete decolorization. Further, the process can be carried out at or above ambient and up to an approximate temperature of 125° C., provided appropriately sealed vessels are used for the process. These sealed vessels cause the decolorization to be carried out at the autogeneous pressure of the specified process temperature. In the case of a chemical system containing methylene chloride and an aqueous solution of sodium hypochlorite, the stripping process can be carried out at 65° C. in an enclosed vessel in which, for example, the dispersed chemical system is circulated through the static colored polymer charge. At the completion of the decolorization, one of a variety of methods for recovering the chemicals and cleaning the polymer is to gradually release the pressure and pass the resulting gases and vapors through an aqueous sodium hydroxide scrubber to capture the components of the sodium hypochlorite formed during the process, then through a condenser to collect the methylene chloride and cool it to a liquid. Such methodology would recover the bleaching/oxidizing agent and the organic chemical for recycling. Once at atmospheric pressure, the remainder of the chemical system is separated from the decolorized polymer. This liquid should be essentially free of all the organic chemical which would have been removed when the gases and vapors were vented into the scrubber and condenser. The polymeric material can then be rinsed and the remaining traces of the bleaching/oxidizing agent decomposed by an antichlor treatment such as sodium bisulfite or sodium thiosulfate. Finally, the decolorized product is rinsed with water and dried.

In order to more fully illustrate the concept of this invention the following examples are given. However, it is to be understood that such examples are not to be construed as unduly limiting the scope of the invention.

EXAMPLE NO. 1

Samples of 100% polyester thread dyed black with a disperse dyestuff were immersed at ambient temperature (approximately 20°–25° C.) in various organic liquids, listed below, using a thread to liquid ratio of 1:10. In all cases a wetting agent, dioctyl sodium sulfosuccinate, was added at the rate of 1 part for every 100 parts of liquid. At the end of 24 hours, the thread samples were taken out of the liquid, squeezed to remove excess, rinsed in fresh liquid, and squeezed and air dried.

Color removal was rated on a scale of 1 to 10 where 1 is total removal of color, leaving a visually white thread and 10 represents virtually no color removal. The organic liquids used in the individual tests under this example were:

| | |
|---|---|
| Methylene chloride | Bromohexane |
| Bromochloromethane | Bromohexadecane |
| Dibromomethane | 1-Bromoheptane |
| Ethylene bromide | 1,1,2-trichloro-1,2,2 trifluroroethane |
| Ethylene chloride | Fluorohexane |
| 1,3 Dichloropropane | Hexane |
| 1,2 Dichloropropane | Cyclohexane |
| 1,3 Dibromopropane | Methyl alcohol |
| Methylene iodide | Ethyl alcohol |
| 1-Iodopropane | Acetone |
| Carbon tetrachloride | Chloroform |
| Dimethyl sulfoxide | Dimethyl formamide |
| Perchloroethylene | Monochlorobenzene |

With the exception of methylene chloride that gave a 3 to 4 color removal rating, and bromochloromethane and dibromomethane with a 4 rating, all other organic liquids rated 9 to 10, or virtually no color removal.

This example clearly shows the difficulty of color removal, at ambient temperature, with organic liquids and even specific stripping agents such as methylene chloride, dimethyl formamide, dimethyl sufloxide and monochlorobenzene that can remove color slowly in a soxhlet-type extraction but do not remove color under simple ambient temperature immersion conditions.

EXAMPLE NO. 2

Sodium hypochlorite (NaOCl) solutions of concentrations varying from 0.25% NaOCl to 15% NaOCl were prepared (Series A).

A second Series B, of similar NaOCl concentrations as Series A, was prepared to include the further addition of 10 parts of a 36.5% solution of hydrochloric acid added to every 90 parts of the NaOCl solution.

A third Series C was prepared by mixing a 1% NaOCl solution with a 36.5% solution of hydrochloric acid in varying ratios (from 95:5 to 25:75). In each of the three series, 1 part per 100 parts by weight of dioctyl sodium sulfosuccinate was added as a wetting agent.

Samples of thread dyed black with a disperse dyestuff were immersed in the various mixtures of Series A, B and C at a thread to liquor ratio of 1:10 by weight, at ambient temperature. After 24 hours of immersion, the thread samples were removed from the mixtures, immersed in a 1% solution of sodium thiosulfate, rinsed with cold water and air dried. The dried samples were rated for color removal on a scale of 1 to 10 as in Example No. 1.

Series A: All samples rated from 9 to 10.
Series B: All samples rated from 3 to 4.
Series C: All samples rated from 3 to 6.

It is apparent from this example that sodium hypochlorite alone (Series A) and at ambient temperature will not strip color from polyester. Further, Series B and C show that some color removal (ratings 3 to 6) can be achieved with the addition of acid. However, no condition could be found that gave total color stripping even after 24 hours at ambient temperature or even when heated to a temperature of approximately 65° C.

EXAMPLE NO. 3

Samples of black 100% polyester thread dyed with a disperse dyestuff were immersed at ambient temperature (20°–25° C.) in the various mixtures listed below. The mixtures were prepared by mixing 10 parts of each organic liquid with 90 parts of a 1% NaOCl solution acidified with a 36.5% hydrochloric acid solution in a ration of 9:1. A wetting agent, dioctyl sodium sulfosuccinate was added (1% on total mix) to improve wettability and produce a coarse dispersion of organic liquid in the aqueous phase. The thread samples in the mixtures were stirred intermittently and after 24 hours were rinsed with water, immersed in a 1% solution of sodium thiosulfate, rinsed again with water and air dried. The thread samples were rated for color removal on a 1 to 10 scale as in Example No. 1.

| Organic Liquid | Rating |
|---|---|
| Methylene chloride | 1 |
| Bromochloromethane | 1 |
| 1,3 Dichloropropane | 1 |
| Carbon tetrachloride | 1 |
| Perchloroethylene | 3 |
| Chloroform | 3 |

-continued

| Organic Liquid | Rating |
| --- | --- |
| Ethylene chloride | ½ |
| 1,2 Dichloropropane | 2 |
| 1,2 Dibromopropane | 1 |
| Ethylene bromide | ½ |
| Bromohexane | 3 |
| Bromohexadecane | 3 |
| 1,1,2-trichloro-1,2,2-trifluoroethane | 3 |
| Fluorohexane | 3 |
| 1-Iodopropane | 10 |
| Methylene iodide | 10 |

With the exception of the two iodo- compounds, all the mixtures gave very good to excellent color removal results showing the effectiveness of the total stripping system.

EXAMPLE NO. 4

The Example No. 3 was repeated for the following organic liquids: ethylene bromide, ethylene chloride, methylene chloride, bromochloromethane, dibromomethane, 1,2 dichloropropane and 1,2 dibromopropane, using the same mix concentrations of the NaOCl and acid. The black 100% polyester thread samples were immersed for 15 minutes, 1 hour, and 24 hours (as repeat controls). The samples were then rinsed, threated with antichlor, rinsed again with water, and air dried. Color removal was rated on a scale of 1 to 10 as in Example No. 1. The data is tabulated below:

| | Color Removal Rating | | |
| --- | --- | --- | --- |
| | After 15 min | After 1 hr. | After 24 hrs. |
| Methylene chloride | 1 | 1 | 1 |
| Bromochloromethane | ½ | 1 | 1 |
| Dibromomethane | ⅔ | 1 | 1 |
| 1,2 Dichloropropane | 5 | 2 | 2 |
| 1,2 Dibromopropane | 5 | 2 | 2 |
| Ethylene chloride | ⅔ | ½ | ½ |
| Ethylene bromide | ⅔ | ½ | ½ |

The data clearly show the effectiveness of the organic liquid and acidified bleaching system and more particularly the effectiveness of the alkali halides for very rapidly stripping color, at ambient temperature, even in cases as difficult as black.

EXAMPLE NO. 5

Samples of 100% textured polyester thread dyed in black (1), beige (2), light blue (3) and dark blue (4) were immersed separately in the following chemical systems using 1:10 thread to liquor ratio by weight. A wetting agent, dioctyl sodium sulfosuccinate, was used in all systems at a 1 part per 100 parts of the total liquid.

| Chemical Systems | Methylene Chloride (%) 100% Active | Sodium Hypochlorite (%) | | Hydrochloric Acid (%) 36.5% Sol |
| --- | --- | --- | --- | --- |
| | | 0.25% Sol | 1.0% Sol | |
| A | 50 | — | 45 | 5 |
| B | 10 | — | 81 | 9 |
| C | 50 | 45 | — | 5 |
| D | 10 | 81 | — | 9 |
| E | 100 | — | — | — |
| F | — | — | 90 | 10 |
| G | — | 90 | — | 10 |

The various thread samples (1–4) were immersed in the different chemical systems (A-G) in closed vessels and maintained at the following temperatures:

I Ambient (20°–25° C.)
II 40°–45° C. and at autogeneous pressure
III 60°–65° C. and at autogeneous pressure
IV 70°–75° C. and at autogeneous pressure The color stripping action of the various chemical systems and at the four temperatures was observed and the final color of the stripped thread was rated. The results were as follows:

Methylene chloride alone (E): With all four colors and at all temperatures, methylene chloride showed significant stripping but total color removal was not achieved even after 24 hours exposure.

Sodium hypochlorite and acid alone (F and G): The acidified bleach solution showed significant stripping at ambient temperature (I) and at 40°–45° C. (II) for all colors. At higher temperatures (III and IV) virtually all coloration was removed after 24 hours from the lighter shades (2 and 3). However, color remained on the aark blue (4) thread sample and a very perceptible yellow coloration persisted on the black (1) sample.

Methylene chloride and acidified hypochlorite systems (A through D): Total stripping resulted in all cases in less than 15 minutes. Stripping efficiency, as measured by the time required to achieve complete removal of color (totally white thread), is highest at temperatures near or above the boiling point of methylene chloride. The differences in the rate of color removal between 0.25% and 1.0% sodium hypochlorite is not as appreciable as between the various immersion temperatures. These experiments clearly illustrate the efficiency of the chemical system described in this invention.

EXAMPLE NO. 6

Samples of 100% polyester thread dyed black with disperse dyestuffs were immersed at ambient temperatures (20°–25° C.) in dimethyl formamide, monochlorobenzene, 5% solution of salicylic acid, dimethyl sufloxide, hexane and 1,4 dioxane, alone and in mixtures with an acidified 1% sodium hypochlorite solution at the rate of 1 part organic chemical and 9 parts of the acidified bleach. A 36.5% solution of hydrochloric acid was used at 10% to acidify the bleaching agent. Dioctyl sodium sulfosuccinate was used as the wetting agent in all cases. The thread to liquor ration was 1:10. The thread samples were examined for color removal after 24 hours immersion time using the 1 to 10 rating described in Example No. 1. In all cases the organic chemicals alone did not noticeably remove the black color (9–10) from the thread. However, all mixtures showed an apparent stripping effect (3–4) and significantly better than with the aqueous acidified bleaching system when used alone.

EXAMPLE NO. 7

Exposed polyester x-ray film that had been stripped of the silver complex was chopped up into quarter to half-inch particles. This film has a distinct blue color which has to be removed in order for the polyester to be reusable by melting and reforming as in pellets, films or fibers. The chemical systems A, B, E and F from Example No. 5 were prepared and samples of the chopped polyester film were immersed in these systems at a liquor ratio of 1:5 at ambient temperature (20°–25° C.). The film chips were examined at 15 minute intervals for up to 60 minutes exposure time in the stripping systems.

With methylene chloride alone (E), the liquid became blue in color and the blue color of the film was reduced significantly after 60 minutes but not totally removed.

The acidified 1% sodium hypochlorite solution (F) had a minimal effect on the film even after 60 minutes.

The alkyl halide and hypochlorite systems (A and B) totally stripped the blue color in about 30 minutes.

EXAMPLE NO. 8

Green plastic 2-liter bottles were cleaned and chopped into one-quarter inch to half-inch particles and immersed in the chemical system A described in Example No. 5 at ambient temperature (20°-25° C.) using a 1:5 liquor ratio. The green color of the particles was stripped after 30 to 45 minutes exposure.

EXAMPLE NO. 9

Samples of dyed nylon yarns were treated with the chemical systems A and B and processed as described in Example No. 5. In all cases, total stripping of the color was achieved in less than 30 minutes.

It should be noted that other modifications of the invention may become apparent to those skilled in the art. However, it is intended that the aforesaid specifications, embodiments and examples are considered as exemplary only, with the true scope and spirit of the invention being defined by the claims below.

What is claimed is:

1. A composition for decolorizing synthetic polymer materials, said decolorizing composition comprising:
   (a) an alkyl halide, said alkyl halide being represented by R-X, with R being an alkyl radical with 1 to 8 carbon atoms, with X being a monohalide, or a polyhalide; and wherein said halide is selected from the group consisting of chloride, bromide and fluoride;
   (b) an aqueous solution of a bleaching/oxidizing agent wherein the concentration of said bleaching/oxidizing agent is in the range of 0.05 to 40 percent by weight of the aqueous solution of said agent and wherein said agent is selected from the group consisting of alkali metal and alkaline earth metal salts of hypohalites and wherein said hypohalite is selected from the group consisting of hypochlorite, hypobromite and mixtures thereof; and
   (c) an aqueous solution of an acid prepared from one or more acids selected from the group consisting of inorganic acids, mono-, di- and tri-carboxylic acids, carboxylic acid anhydrides and hydroxy carboxylic acids; and
   (d) an aqueous solution of a surfactant selected from the group including nonionic and anionic surfactants.

2. A decolorizing composition as in claim 1 wherein the alkyl halide is selected from the homohalide group consisting of mono-, di-, tri- and tetrahalo-methanes, ethanes, propanes, butanes, pentanes, hexanes, heptanes and octanes wherein the halo radical is chloro, bromo or fluoro; and from the mixed halide group consisting of di-, tri- and tetrahalo-methanes and ethanes wherein the halo is mixtures of chloro and bromo.

3. A decolorizing composition as in claim 2 wherein the dihalomethane is dichloromethane (methylene chloride).

4. A decolorizing composition as in claim 1 wherein the said bleaching/oxidizing agent is selected from a group consisting of alkali metal salts of hypohalites wherein the alkali metal is chosen from the group that includes sodium, potassium and lithium; and of alkaline earth metal salts of hypohalites wherein the alkaline earth metal is calcium or magnesium and the hypohalite is hypochlorite, hypobromite or mixtures thereof.

5. A decolorizing composition as in claim 4 wherein the bleaching/oxidixing agent is sodium hypochlorite.

6. A decolorizing composition as in claim 1 wherein said acid is selected from the group consisting of hydrochloric acid, formic acid, acetic acid, oxalic acid, citric acid, and mixtures thereof.

7. A decolorizing composition as in claim 5 wherein the concentration of sodium hypochlorite is in the range of 0.01 to 10 percent by weight of the aqueous solution of the sodium hypochlorite.

8. A decolorizing composition as in claim 1 wherein the concentration of the pure acid compound is in the range of 0.01 to 10 percent by weight of the total aqueous solution of the bleaching/oxidizing agent and the acid compound.

9. A decolorizing composition as in claim 1 wherein the alkyl halide and the aqueous solution of bleaching/oxidizing agent and acid compound are mixed in a relative volume ratio in the range of 5:95 to 90:10.

10. A decolorizing composition as in claim 1 wherein the anionic surfactant/wetting agent is dioctyl sodium sulfosuccinate in a concentration range of 0.01 to 1 percent by weight of the total dye stripping composition.

11. A decolorizing composition as in claim 1 further comprising a mixture of methylene chloride and a 0.01 to 1 percent by weight sodium hypochlorite aqueous solution which contains 0.5 to 5 percent by weight of hydrochloric acid or acetic acid; said mixture consisting of a relative volume ratio of the respective components in the range of 10:90 to 60:40; and being dispersed with 0.1 to 1 part of a surfactant including dioctyl sodium sulfosuccinate per 100 parts of the total decolorizing composition.

12. A single-stage decolorizing process for the removal of coloring matter and dyes from synthetic polymers in the form of powders, pellets, chips, films, sheet, fibers, ribbons, fabrics, rods, tubes, containers or bottles, said process comprising the steps of: (1) contacting the colored polymer with a decolorizing composition at a prescribed temperature and pressure; and (2) maintaining said contact for a prescribed time to remove all coloration from the polymer.

13. A decolorizing process according to claim 12 wherein the dye stripping composition consists of:
   (a) an alkyl halide;
   (b) an aqueous solution of a bleaching/oxidizing agent selected from the group consisting of alkali metal and alkaline earth metal salts of hypohalites and mixtures thereof;
   (c) an aqueous solution of an acid selected from the group consisting of inorganic acids, mono-, di-and tri-carboxylic acids, acid anhydrides and hydroxy carboxylic acids; and
   (d) a surfactant/wetting agent selected from the group consisting of nonionic and anionic surfactants.

14. A decolorizing process as in claim 12 wherein the synthetic polymer material is selected from the group consisting of polyesters, polyamids, aramids, and polyurethanes.

15. A decolorizing process as in claim 12 wherein the synthetic polymer material is polyester.

16. A decolorizing process as in claim 12 wherein the synthetic polmer material is placed in contact with said dye stripping composition at atmospheric pressure and at a temperature ranging from ambient to the boiling point of said alkyl halide component or of the aqueous medium of the dye stripping composition, whichever is lower.

17. A decolorizing process as in claim 12 wherein the synthetic polymer material is contacted with said dye stripping composition in a closed pressure vessel at a temperature ranging from about 40° C. to 125° C., and at the autogeneous pressure of the system for a time prescribed to remove totally all coloration from the polymer material.

18. The process as in claim 12 wherein the dye stripping composition is circulated through the synthetic polymeric material contained in a closed vessel at a temperature ranging from ambient to substantially 125° F. and at the autogeneous pressure of the system for a period of time sufficient to remove all coloration.

19. The process as in claim 12, further comprising the steps of:
(a) dropping the dye stripping composition;
(b) rinsing the decolorized synthetic polymeric material with a solution of an antioxidant and a surfactant;
(c) rinsing the material with water, and
(d) drying the material.

20. The process as in claims 18 or 19 wherein the alkyl halide is reclaimed from the system after completing the decolorization of the synthetic polymer material by (1) scrubbing with an aqueous alkali solution or water to remove entrained acid and bleaching/oxidizing components of the chemical system; and (2) condensing the vapors to a liquid for re-use.

21. A process as in claim 12 wherein the alkyl halide is represented by R-X, with R being an alkyl radical with 1 to 8 carbon atoms, with X being a monohalide, a homo- or a mixed polyhalide; and wherein said halide is selected from the group consisting of chloride, bromide and fluoride.

22. The process as in claim 12 wherein the alkyl halide is selected from the homohalide group consisting of mono-, di-, tri- and tetrahalo-methanes, ethanes, propanes, butanes, pentanes, hexanes, heptanes and octanes; and wherein the halo radical is chloro, bromo or fluoro; and from the mixed halide group consisting of di-, tri- and tetrahalo-methanes and ethanes wherein the halo is mixtures of chloro and bromo.

23. The process as in claim 24 wherein the dihalomethane is dichloromethane (methylene chloride).

24. The process as in claim 12 wherein said bleaching-/oxidizing agent is selected from the group consisting of alkali metal salts of hypohalites wherein the alkali metal is sodium, potassium or lithium, and of alkaline earth metal salts of hypohalites wherein the alkaline earth metal is calcium or magnesium.

25. The process as in claim 24 wherein the bleaching-/oxidizing agent is sodium hypochlorite.

26. The process as in claim 12 wherein said acid is selected from the group consisting of hydrochloric acid, formic acid, acetic acid oxalic acid, citric acid, and mixtures thereof.

27. The process as in claim 12 wherein the concentration of the bleaching/oxidizing agent is in the range from about 0.05 to 40 percent by weight of the aqueous solution of the bleaching/oxidizing agent.

28. The process as in claim 27 wherein the concentration of the sodium hypochlorite is in the range of 0.01 to 10 percent by weight of the aqueous solution of sodium hypochlorite.

29. The process as in claim 12 wherein the concentration of the pure acid compound is in the range from 0.01 to 10 percent by weight of the total aqueous solution of the bleaching/oxidizing agent and the acid compound.

30. A decolorizing process according to claim 12 wherein said decolorizing composition comprises said alkyl halide and said aqueous solution of bleaching/oxidizing agent and acid compound being mixed in a relative volume ratio in the range of 5:95 to 90:10.

31. The process as in claim 12 wherein the anionic surfactant/wetting agent is dioctyl sodium sulfosuccinate in a concentrate ranging from 0.01 to 1 percent by weight of the total dye stripping composition.

32. The process as in claim 12 wherein the decolorizing composition comprises a mixture of methylene chloride and a 0.1 to 1 percent by weight of sodium hypochlorite aqueous solution; said sodium hypochlorite aqueous solution containing 0.5. to 5 percent by weight of hydrochloric acid or acetic acid; and said mixture having a relative volume ration of the respective components in the range of 10:90 to 60:40, and being dispersed with 0.1 to 1 part by weight of a surfactant as dioctyl sodium suflosuccinate per 100 parts of the total dye stripping composition.

* * * * *